3,111,028
TORQUE METER
Milton J. Lebow, Oak Park, Mich., assignor to Lebow Associates, Incorporated, Oak Park, Mich., a corporation of Michigan
Filed Aug. 22, 1960, Ser. No. 50,964
4 Claims. (Cl. 73—136)

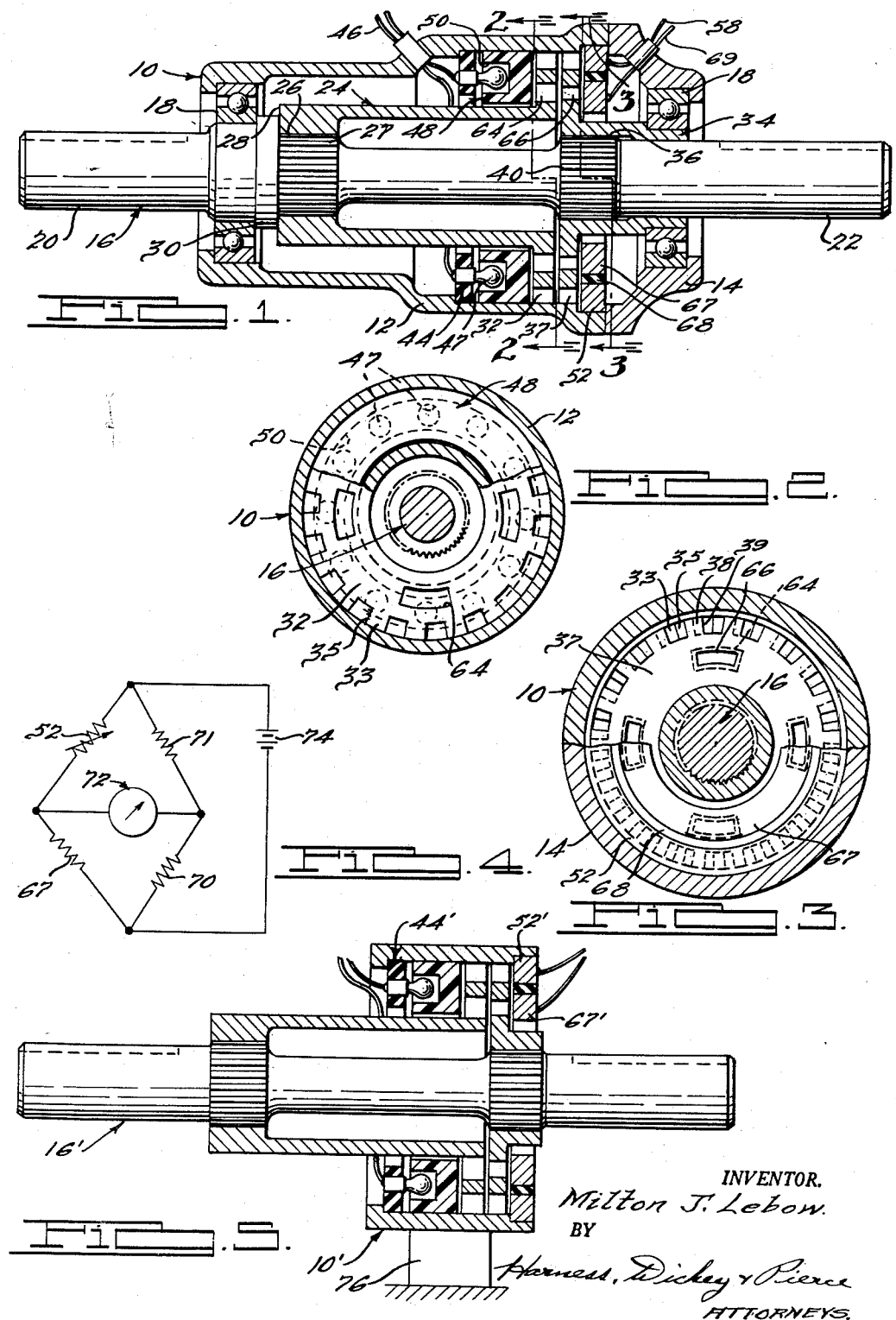

This invention relates to apparatus for providing an electrical signal which is a function of the torsional deflection of a shaft.

Other devices of the type disclosed herein for measuring torsion in a shaft contain a single stationary and concentrated source of light associated with a torsionally loaded shaft and a pair of members located on the shaft which rotate relative to one another according to the torsional deflection of the shaft. The pair of members are provided with alternate teeth and slots, or the like, such that upon relative rotation a tooth of one member covers more or less a slot in the other member, thereby altering the area through which light from the light source can be transmitted. These devices are usually associated with a stationary photosensitive device whereby the variations in quantity of light transmitted from the source through the two members are detected. It is common practice for the photosensitive device to be a single phototube of conventional design.

In the past, one source of difficulty with the devices constructed as discussed above has been in obtaining a calibration either statically or at a given speed which was accurate regardless of the speed at which the device was to read the torque. It appears that by having a single substantially concentrated source of light and a single phototube of conventional design, both of which are stationary, the static response of the device differs from the dynamic response thereby requiring calibration during rotation. One way of eliminating this difficulty is to have the phototube and light source rotate with the torque shaft. In doing this, however, slip rings are required to provide power to the light source and to provide means for taking the signal from the phototube. The use of slip rings introduces the inherent difficulties of change in contact resistance, loss of brush contact, etc.

The apparatus disclosed herein is of means for providing a signal usable for reading the torque in a shaft or for obtaining an indication of horsepower eliminating the problems inherent with past devices.

It is an object of this invention to provide improved apparatus for indicating the torsional load on a shaft.

It is an object of this invention to provide apparatus for producing a signal which is a function of the torsional deflection of a shaft and which is unaffected by variations in the speed of the shaft whereby a calibration can be made at any speed for use at any other speed.

Other objects, features and advantages of the present invention will become apparent from the subsequent description, taken in conjunction with the accompanying drawings, in which:

FIGURE 1 is a sectional side elevational view of a preferred embodiment of the device;

FIGURE 2 is a view taken along the line 2—2 of FIGURE 1;

FIGURE 3 is a view taken along the line 3—3 of FIGURE 1;

FIGURE 4 is a schematic diagram of one form of indicating circuit, and

FIGURE 5 is a sectional side elevational view of a modification of the preferred embodiment of the device.

Looking now to FIGURE 1, a stationary lightproof housing 10 consisting of members 12 and 14 is supported on a torque shaft 16 by means of bearings 18. The housing 10 can be assembled by either providing mating threaded areas on 12 and 14 or by providing means for bolting the members 12 and 14 together. In either event, the internal portion of the housing 10 is shielded from light external to the housing 10. In actual operation end portions 20 and 22 of shaft 16 are connected between a power source (not shown) and an energy absorbing or converting device (not shown) such that any torque delivered by the power source is transmitted by way of the shaft 16. A sleeve member 24 having an aperture 26 internally splined is then fixedly mounted upon the shaft 16 by means of a splined portion 27 on shaft 16. An end face 28 of the sleeve member 24 abuts shoulder portion 30 on the shaft 16. A flange 32 having alternate teeth 33 and intermediate gaps 35 around its periphery is provided upon sleeve member 24 at the end opposite from the aperture 26. A flanged member 34 having an internally splined hub portion 36 is then fixedly mounted on splined portion 40 on the shaft 16. The member 34 has a flange portion 37 with alternate teeth 38 and intermediate gaps 39 being disposed around its periphery in juxtaposition to the teeth 33 and gaps 35 on flange 32.

The relative angular deflection between any two points upon the shaft 16 is dependent upon the torque on the shaft and the distance between those points. From FIGURE 1 it can be seen that the relative angular deflection between the sleeve member 24 and the flanged member 34 is dependent upon the distance between the splined portions 27 and 40 of the shaft 16. Since that distance is fixed, the relative rotation between the toothed flanges 32 and 37 will vary with the applied torque.

Looking now to FIGURES 2 and 3, with zero torque load on shaft 16, the flange 32 is oriented such that the axial projection of teeth 33 covers one-half of the gaps 39 between the teeth 38 on the flange portion 37; likewise, the axial projection of the teeth 38 covers one-half of the gaps 35 between the teeth 33 on flange 32.

As the shaft 16 is twisted in one direction, more of each of the gaps 39 is covered by the axial projection of teeth 33; conversely, if shaft 16 is twisted in the opposite direction, less of each gap is covered. The same, of course, holds true for the teeth 38 and gaps 35.

A light source 44 energized through lead wires 46 is axially disposed to one side of the flange 32 and flange portion 37 in the member 12 of the lightproof housing 10. In the preferred embodiment shown in FIGURE 1, the light source 44 is comprised of a plurality of circumferentially disposed individual incandescent filament lights 47 and an annular diffusing member 48 of translucent material, having an annular recess 50 for accepting the plurality of individual lights 47. The diffusing member 48 spreads the light emanated from the circumferentially disposed individual lights 47, and itself becomes as an annular source of light of substantially constant intensity. The plurality of individual lights 47 and the diffusing member 48 could be replaced by a single annular lighting element or any other form of annular light source.

A light sensor 52 is annularly disposed within the member 14 of the lightproof housing 10 and is axially located on the other side of the flange 32 and flange portion 37. The light sensor 52 is a photoresponsive cell of the type undergoing a change in electrical characteristic in accordance with a change in the quantity of light impinging on its surface. Treating the diffusing member 48 as an annular source of light, the quantity of light impinging upon the light sensor 52 will vary as a function of the axially projected interference between the teeth 33 and gaps 39 and the teeth 38 and gaps 35. The amount of change in projected interference will depend upon the relative rotation between the flange 32 and flange portion 37 and hence upon the magnitude and direction of the torque on shaft 16; thus means are provided for producing an electrical signal which varies in magnitude according to the magnitude and direction of the torque on a shaft.

A lead wire 58 is provided to connect the light sensor 52 to an external indicating circuit. If the light sensor 52 is a photoconductive type of cell, the change in electrical characteristic could be indicated by an ohmmeter having a calibrated torque scale. If the sensor is a photovoltaic type of cell, a voltmeter could be used to provide the indication.

In the preferred embodiment shown in the FIGURES 1, 2 and 3, four substantially rectangular slots 64 are radially located in the flange 32 of sleeve member 24 and are in juxtaposition to four corresponding rectangular slots 66 radially located in flange portion 37 of flanged member 34. A second light sensor 67 is annularly disposed adjacent the light sensor 52 and is radially displaced and insulated from sensor 52 by the annular insulating ring 68. The sensor 67 is placed in axial alignment with the slots 64 and 66. A lead wire 69 is provided to connect the light sensor 67 to an external circuit. The sensor 67 is a photoresponsive cell of the same type as sensor 52. The axially projected openings of slots 64 and 66 provide an area for light transmission to the light sensor 67 which is independent of the relative rotation between the sleeve member 24 and flanged member 34. In order to insure a constant area of light transmission, the slots 64 are made sufficiently larger than the slots 66 to insure that the entire area of each of the smaller slots 66 is always axially aligned with a portion of the corresponding larger slots 64. Under no load conditions the total axially projected area through the slots 64 and 66 is equal to the total axially projected area through the gaps 35 and 39. By using an indicating system in which the resultant indication is a function of the ratio of the quantity of light transmitted through the variable area to that transmitted through the fixed area, the output of the sensor 52 is automatically corrected for variations occurring in the light intensity due to aging, dirt, variations in supply voltage, etc.

In the preferred embodiment the light sensors 52 and 67 are photoconductive type cells having an electrical resistance in accordance with the quantity of light impinging upon its surface. FIGURE 4 is a schematic diagram for utilizing photoconductive cells with the light sensor 52 being represented as a variable resistance, the light sensor 67 as a fixed resistance, and resistors 70 and 71 as conventional resistors to complete the bridge. Some type of indicating device 72 is connected across two legs of the bridge while a source of potential 74 is connected across opposite legs of the bridge. As torque is applied to shaft 16 causing more or less light to be transmitted through the gaps 35 and 39 the unbalance created by a differential change in resistance between the light sensors 52 and 67 results in a difference in potential occurring across the indicating device 72. Thus, the indicating device 72 provides an indication in accordance with the amount of unbalance of the bridge and hence in accordance with the magnitude of the torque on shaft 16. The circuit of FIGURE 4 could be altered so as to provide a null balance instead of an unbalance indication.

When the light sensors 52 and 67 are of the photovoltaic type they may simply be connected in series with a sensitive ammeter and with their polarities opposed so that the meter reflects the voltage difference.

Alternative light sensors include photovoltaic cells which produce a voltage or current proportional to the amount of light which impinges on them, such as those made of selenium or silica, and each of which extends annularly around the shaft or a single remotely positioned photosensitive cell of either the photoconductive or photovoltaic type coupled with an optical system for collecting the light over the entire annular region and transmitting it to the cell. One suitable form of optical system consists in a plurality of rods of clear plastic capable of internal light transmission, one end of each rod being positioned to receive light projected through the interfering teeth from the light source and the other end being positioned against the face of the cell. The light receiving ends of the rods will be arranged in an annular bundle to constitute a virtually continuous annular light receiving means.

The sensitivity of the disclosed device, i.e., change in light transmission area per pound foot of applied torque, will increase as the distance between the splined portions 27 and 40 of the shaft 16 is increased. This distance will be determined by the maximum torque to be carried by the shaft, the diameter of the shaft, and the available space. Once this distance is fixed the sensitivity of the device can be increased by increasing the number of teeth 33 and 38. It can be appreciated that the selection of the various parameters discussed above will be dependent upon the circumstance surrounding the anticipated use of the device and can be readily determined for that application.

In the preferred embodiment of FIGURES 1, 2 and 3, the interference between teeth and gaps is utilized to provide variations in the quantity of light transmitted in accordance with the torque on the shaft 16. Other means of providing a similar result are possible.

In the embodiment shown in FIGURE 1 the ends 20 and 22 of shaft 16 are intended to be coupled to driving and driven shafts respectively and thus shaft 16 constitutes a driving connection between them. Since it is assumed that the driving and driven shafts are otherwise supported, they are relied upon to support shaft 16; and shaft 16 in turn supports housing 10 by means of the bearings 18. Shaft 16, the sleeve member 24 and the flanged member 34 rotate together as a unit, while the lightproof housing 10, the light source 44 and light sensors 52 and 67 are prevented from rotating (by means not shown).

In a second embodiment of the device as shown in FIGURE 5, the housing 10', the light source 44' and the light sensors 52' and 67' are fixedly supported and also held from rotation by attachment 76. Since the non-rotating parts are not supported by the shaft 16' and the shaft 16' is assumed to be supported by means not shown, no bearings are required between the housing 10' and the shaft 16'.

In the device shown in FIGURE 5 a lightproof housing is not required. Elimination of the need for lightproofing can be accomplished by selecting light sensors 52' and 67' which are responsive to invisible light, i.e., infrared or ultraviolet light, and by utilizing a light source 44' emanating that wave length. Alternatively this type can be used on shafts which are mounted in unlighted enclosures or housings. The operation of the embodiment shown in FIGURE 5 is similar to that of the embodiment as shown in FIGURES 1, 2 and 3 and as described above.

In the apparatus described above, the magnitude of the twist of the shaft 16 is detected by the sensor 52 from which an electrical signal is obtained. Since rotational power is a function of the product of speed and torque, this torque signal could be utilized along with another signal from a speed transducer to provide an indication of power transmitted.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. Apparatus for providing an electrical signal having a magnitude which varies in accordance with the magnitude of the torque applied to a rotatable shaft comprising illumination means annularly disposed about the shaft for providing annularly a substantially constant intensity of illumination, a first and second photoresponsive member being annularly disposed about the shaft for providing an electrical characteristic varying in accordance with the quantity of light received from said illumination means, first interference means being located between said illumination means and said photoresponsive members and having a plurality of light transmitting and light rejecting areas annularly disposed in regular intervals about the shaft and having a light transmitting portion annularly disposed about the shaft, second interference means having a plurality of light transmitting and light rejecting areas annularly disposed in regular intervals about the shaft in juxtaposition to said areas of said first interference means and being operatively associated with said first interference means for modulating the quantity of light transmitted by said illumination means to said first photoresponsive member in accordance with the relative rotation between said areas on said first and second interference means and having a light transmitting portion in juxtaposition to said portion on said first interference means for providing for the transmission of a substantially constant quantity of light from said illumination means to said second photoresponsive member, said first and said second interference means being secured to the shaft at axially spaced locations with the result that such means are rotationally displaced with respect to one another in proportion to the twisting under load of the shaft portion between the locations of connection of such means to the shaft.

2. Apparatus for providing an electrical signal having a magnitude which varies in accordance with the magnitude of the torque applied to a rotatable shaft comprising illumination means being annularly disposed stationarily about the shaft for providing annularly a substantially constant intensity of illumination, a first and second photoresponsive member being annularly disposed stationarily about the shaft for providing an electrical characteristic varying in accordance with the quantity of light received from said illumination means, first interference means being located between said illumination means and said photoresponsive members and having a plurality of teeth and a plurality of light transmitting areas disposed annularly in regular intervals about the shaft, second interference means having a plurality of teeth annularly disposed in regular intervals about the shaft in juxtaposition to said teeth of said first interference means and being operatively associated with said first interference means for modulating the quantity of light transmitted by said illumination means to said first photoresponsive member in accordance with the relative rotation between said pluralities of teeth on said first and second interference means and having a plurality of light transmitting areas annularly disposed in regular intervals about the shaft in juxtaposition to said areas on said first interference means for providing the transmission of a substantially constant quantity of light from said illumination means to said second photoresponsive member, said first and said second interference means being secured to the shaft at axially spaced locations with the result that such means are rotationally displaced with respect to one another in proportion to the twisting under load of the shaft portion between the locations of connection of such means to the shaft.

3. Apparatus for providing an electrical signal having a magnitude which varies in accordance with the magnitude of the torque applied to a rotatable shaft comprising stationarily disposed illumination means for providing annularly a substantially constant intensity of illumination including a plurality of light sources annularly disposed about the shaft and an annular diffusing member disposed proximate to said plurality of light sources for diffusing the light emanating from said plurality of light sources, a first and second photoresponsive member being annularly disposed stationarily about the shaft for providing an electrical characteristic varying in accordance with the quantity of diffused light received from said illumination means, first interference means being located between said illumination means and said photoresponsive members and having a plurality of teeth and a plurality of light transmitting areas disposed annularly in regular intervals about the shaft, second interference means having a plurality of teeth annularly disposed in regular intervals about the shaft in juxtaposition to said teeth of said first interference means and being operatively associated with said first interference means for modulating the quantity of diffused light transmitted by said illumination means to said first photoresponsive member in accordance with the relative rotation between said pluralities of teeth on said first and second interference means and having a plurality of light transmitting areas annularly disposed in regular intervals about the shaft in juxtaposition to said areas on said first interference means for providing the transmission of a substantially constant quantity of diffused light from said illumination means to said second photoresponsive member, said first and said second interference means being secured to the shaft at axially spaced locations with the result that such means are rotationally displaced with respect to one another in proportion to the twisting under load of the shaft portion between the locations of connection of such means to the shaft.

4. The apparatus according to claim 3 wherein said first and second photoresponsive members are of the type providing changes in electrical resistance in accordance with the changes in quantity of light impinging thereon.

References Cited in the file of this patent
UNITED STATES PATENTS

| | | |
|---|---|---|
| 2,313,923 | Chubb | Mar. 16, 1943 |
| 2,402,719 | Allison | June 25, 1946 |

FOREIGN PATENTS

| | | |
|---|---|---|
| 417,051 | Great Britain | Sept. 21, 1934 |

OTHER REFERENCES

Tech. pub. entitled "Torquemeter," by R. H. Peterson, appearing on pages 33 and 34 of IBM Technical Disclosure Bulletin, vol. 1, No. 5, February 1959.